United States Patent [19]

Schubert

[11] 4,317,332
[45] Mar. 2, 1982

[54] HYDRAULIC POWER BRAKE SYSTEM AND HYDRAULIC BRAKE BOOSTER AND CONTROLS THEREFOR

[75] Inventor: Malvin L. Schubert, Kettering, Ohio

[73] Assignee: General Motors Corporation, Detroit, Mich.

[21] Appl. No.: 147,966

[22] Filed: May 8, 1980

Related U.S. Application Data

[62] Division of Ser. No. 16,208, Feb. 28, 1979.

[51] Int. Cl.³ .............................................. B60T 13/00
[52] U.S. Cl. .................................... 60/547 R; 60/418;
60/582; 91/373; 91/417 R; 91/451
[58] Field of Search ................. 60/547 R, 547 B, 548,
60/582, 547 A, 403, 413, 418; 91/451, 452, 48,
49, 369 A, 373, 417 R

[56] References Cited

U.S. PATENT DOCUMENTS

| | | |
|---|---|---|
| 3,050,944 | 8/1962 | Schwartz . |
| 3,054,387 | 9/1962 | Kellogg . |
| 3,633,363 | 1/1972 | Larsen ........................................ 91/6 |
| 3,677,002 | 7/1972 | Fulmer . |
| 3,707,880 | 1/1973 | Bach ..................................... 91/373 |
| 3,785,393 | 1/1974 | Tanguy ................................ 60/418 |
| 4,075,840 | 2/1978 | Jesswein ............................... 60/484 |
| 4,149,379 | 4/1979 | Shimizu ................................ 60/582 |

Primary Examiner—Abraham Hershkovitz
Attorney, Agent, or Firm—D. D. McGraw

[57] ABSTRACT

A hydraulic pressure actuated power brake system having a hydraulic power booster with operating pressure on both sides of the power piston power wall. The booster is therefore hydraulic pressure suspended so that the hydraulic pump of the system need not be operating to maintain this pressure while the booster is inactive. An accumulator is also charged by this pressure to provide power brake booster operation for several booster actuations without recharging by the pump. When the pump is operating, a pilot valve which is sensitive to a drop in booster operating pressure will control charging or recharging the accumulator and booster from the pressure generated by the pump to maintain a desired charge pressure. A pressure relief valve will also prevent overcharging of the accumulator and booster. A check valve prevents loss of booster operating pressure toward the pump outlet if the pump pressure falls below the charged pressure. A spool control valve in the booster modulates pressure on the downstream power piston side, returning fluid to the pump reservoir and creating a controlled pressure differential across the piston power wall to actuate the booster. A mechanical follow-through is provided for manual operation when booster operating pressure is depleted.

1 Claim, 2 Drawing Figures

HYDRAULIC POWER BRAKE SYSTEM AND HYDRAULIC BRAKE BOOSTER AND CONTROLS THEREFOR

This is a division of application Ser. No. 016,208, filed Feb. 28, 1979.

The invention relates to a hydraulic pressure actuated power brake system and more particularly to one in which the hydraulic brake booster is pressure suspended. One aspect of the invention is the provision for maintaining the hydraulic pressure on each side of the booster power wall within a predetermined range so that power is always available to the booster whether or not the hydraulic pressure pump is operating at the time such power is required. This is accomplished by providing a check valve to prevent flow of hydraulic pressure backward toward the pump when the pump ceases operating, an accumulator between the check valve and the hydraulic brake booster to accumulate hydraulic pressure to the desired level, a pressure relief valve which will bypass fluid back to the pump reservoir if the pressure in the accumulator and hydraulic booster exceeds a predetermined maximum value, and a pilot pressure operated pressure charging valve sensing the pressure in the accumulator and hydraulic booster and also being in fluid communication with the output side of the pump upstream of the check valve and in fluid communication with the output side of the pump upstream of the check valve and in fluid communication with the return conduit connecting to the pump reservoir. The pilot valve and the relief valve cooperate to maintain and provide a booster operating pressure generated by the pump in the accumulator and the hydraulic booster, the operating pressure being maintained within a predetermined pressure range suitable for establishing a differential pressure in the booster when the booster is actuated irrespective of the operating pressure being generated by the pump at the time of brake actuation. The pilot valve controls the amount of charging pressure provided, and the pressure relief valve provides an absolute maximum charging pressure limit if the pilot valve should for some reason allow the charging pressure to increase to that limit.

Another aspect of the invention is the provision of a hydraulic pressure suspended power brake booster and controls for the booster. The controls include a control valve having an open center portion which when operated closes fluid communication between a first chamber on one side of the booster power wall and a second chamber on the other side of the booster power wall. Prior to the closing of this valve portion both chambers were maintained at a predetermined operating pressure. The control valve also has a closed center portion which opens when the booster is operated and provides fluid communication between the second chamber and an exhaust chamber, the first chamber still being charged at the operating pressure. Thus the closed center valve portion operates to modulate a decrease in pressure on one side of the power wall to establish a desired pressure differential across the power wall in accordance with the amount of boosted force required. The controls also include means maintaining the hydraulic pressure in the booster, and particularly in the chamber connected to the booster inlet.

IN THE DRAWING

Figure 1:
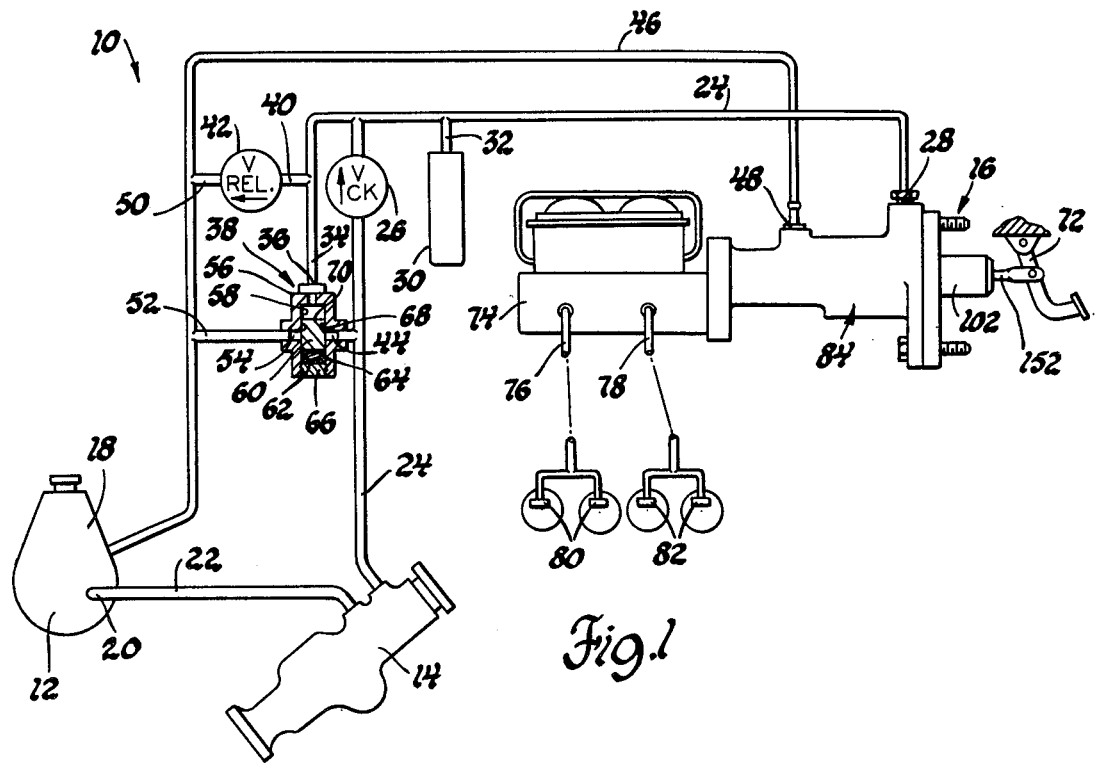
FIG. 1 is a schematic representation of a hydraulic pressure actuated brake booster and system, with parts broken away and in section.

The system 10 is a hydraulic pressure system using a pump 12 to provide hydraulic pressure for power operation of a power steering gear 14 and a hydraulic brake booster 16. The pump 12 has a reservoir 18 for hydraulic fluid used in the system. The pump outlet 20 is connected to conduit 22, which leads into power steering gear 14. As is well known in the art, the power steering gear is of the open center type. Another conduit 24 leads out of the power steering gear 14, through check valve 26 and into the inlet 28 of the booster 16. A hydraulic pressure accumulator 30 is in fluid communication with the portion of conduit 24 between valve 26 and booster inlet 28, being connected to that conduit by a suitable connection 32. A branch 34 of conduit 24, also in communication with conduit 24 between check valve 26 and brake booster inlet 28, is connected to an inlet 36 of a pilot pressure operated pressure charging valve 38 and also to the inlet side 40 of a pressure relief valve 42. The portion of conduit 24 between power steering gear 14 and check valve 26 is connected to another inlet 44 of valve 38. An exhaust conduit 46 is connected to the outlet 48 of booster 16 and returns hydraulic fluid to the pump reservoir 18. Conduit 46 has a connection 50 communicating with the outlet side of pressure relief valve 42. Conduit 46 has another connection 52 communicating with the outlet 54 of valve 38.

Valve 38 is schematically illustrated. It has a housing 56 provided with a bore 58. Inlet 36 opens into one end of bore 58. Inlet 44 and outlet 54 open into the side wall of bore 58 and are in planar alignment with each other. A piston-like valve 60 is reciprocably received in bore 58. The valve is inserted in the bore end 62, after which a valve spring 64 is inserted. A plug 66 is then threaded into the bore end 62 to seal the bore and provide a seat for spring 64 so that the spring continually urges valve 60 toward inlet 36. Valve 60 has an annular groove 68 which, when aligned with inlet 44 and outlet 54, communicates fluid from conduit 24 to the pump reservoir 18 through connection 52 and conduit 46. Groove 68 is out of alignment with inlet 44 and outlet 54 before the accumulator and booster are charged. Upon either initial charging or recharging groove 68 is moved into that position only when hydraulic pressure at inlet 36 acting on the valve end 70 is sufficient to overcome the force of spring 64 and move the piston so that groove 68 communicates inlet 44 to outlet 54. With the accumulator and booster fully charged, the fluid being circulated through the power steering gear bypasses through groove 68 at a relatively low pressure, minimizing the load on the pump when neither the power steering gear or the brake booster is being operated. Under this condition check valve 26 is closed.

Booster 16 is conditioned to be operated by the vehicle operator through a brake pedal 72. The booster actuates a master cylinder 74, which pressurizes brake fluid in the brake circuits 76 and 78. These circuits are schematically illustrated as being connected to respectively actuate vehicle front brakes 80 and vehicle rear brakes 82.

Figure 2:
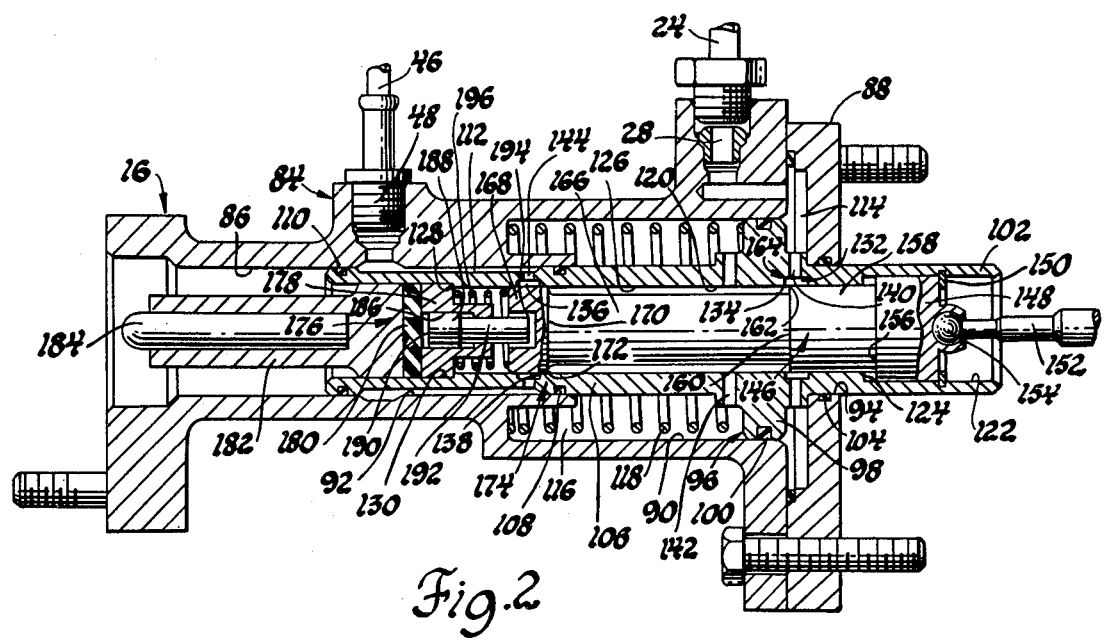
FIG. 2 is a cross section view of the hydraulic brake booster of the system in FIG. 1, with parts broken away.

Booster 16 is illustrated in detail in FIG. 2. The booster has a housing 84 with a bore 86 formed therethrough. An end cover 88 forms a part of the housing 84. Bore 86 has a central section 90 of larger diameter, a section 92 extending forwardly from section 90 of a smaller diameter, and a section 94 formed in the end cover 88 and extending rearwardly of central section 90. Bore sections 92 and 94 have substantially equal diameters. A power piston 96 is sealingly and reciprocably received in bore 86. Piston 96 has a flange-like power head 98 provided with a piston seal 100 at its outer periphery. Seal 100 seals against the bore wall of bore section 90 while permitting movement of the piston in the bore. Piston 96 has a rearward extension 102 which extends through bore section 94 and a suitable seal 104. Extension 102 extends outwardly of housing 84. Piston 96 has a forward extension 106 extending forwardly of the power head 98 and into bore section 92. Piston extension 106 is provided with an intermediately positioned seal 108 and another seal 110 adjacent its forward end. These seals engage the bore wall of bore section 92. The portions of the power piston extensions where seals 104, 108 and 110 are positioned are of substantially the same diameter so as to provide a hydraulically balanced piston power head. The portion of piston forward extension 106 between seals 108 and 110 is diametrically relieved to some extent so that an annular exhaust chamber 112 is defined by the piston and the wall of bore section 92 intermediate seals 108 and 110. Booster outlet 48 is in continuous fluid communication with chamber 112. One side of piston power head 98 cooperates with end cover 88 and a part of bore section 90 to define a first hydraulic pressure chamber 114 on the rear side of the power head. Inlet 28 is in continuous fluid communication with chamber 114. The forward side of the power head 98 cooperates with a part of bore section 90 and the power piston forward extension 106 to define an annular second hydraulic pressure chamber 116. A piston return spring 118 is positioned in chamber 116 and acts against the power head 98 to urge the piston to the booster released position illustrated in FIG. 2.

Piston 96 has a bore 120 formed therethrough. Bore 120 has a rear section 122 extending forwardly to a shoulder 124 separating bore rear section 122 and a bore intermediate section 126. Near the forward end of the bore 120, in the piston forward extension 106, another shoulder 128 separates the forward end of bore section 126 from a forward bore section 130. Bore sections 122 and 130 are slightly larger in diameter than bore section 126. An internal groove 132 is formed in bore section 126 axially adjacent the position of power head 98 and slightly to the rear. Groove 132 is defined by opposite edges, the forward one 134 of which is part of a valve to be described. A similar internal groove 136 is formed in bore section 126 axially forward of the position of seal 108 and is defined by opposed edges, the rearward one 138 of which forms a part of another valve to be described. One or more radial passages 140 are provided in power piston 96 to provide continuous fluid communication between chamber 114 and groove 132. Radial passages 140 are therefore adjacent the rear side of power head 98. A similar set of passages 142 positioned axially just forward of power head 98 open a portion of bore section 126 into fluid communication with chamber 116. Another set of passages 144 are formed in piston forward extension 106 just axially forward of seal 108 and provide continuous fluid communication between groove 136 and exhaust chamber 112.

A spool type control valve 146 is positioned in piston bore 120. Valve 146 has a rear land 148 which is engageable with a valve stop 150 secured in piston bore section 122. The booster push rod 152 is suitably secured to the rear end of control valve 146 as illustrated by the ball and socket arrangement 154. Push rod 152 is suitably connected to brake pedal 72 for actuation. The forward side of land 148 defines a shoulder 156 which is in axial alignment with shoulder 124 and normally spaced from that shoulder. Upon sufficient forward movement of control valve 146 shoulder 156 can engage shoulder 124. The control valve has another land 158, of somewhat smaller diameter than land 148, immediately forward of shoulder 156 and terminating on its forward side to define another shoulder 160. The edge 162 of shoulder 160 forms another part of a valve 164. Valve 164 is composed of the edges 134 and 162, which are axially spaced apart when the booster is released so that the valve is an open center valve. Continuing forward from shoulder 160, the control valve 146 has a still smaller diameter section 166 extending to a control valve forward land 168. Lands 158 and 168 are of substantially the same diameter. The rearward side of land 168 has a shoulder 170, the edge 172 of which forms a part of a closed center valve 174. In the booster released position illustrated in FIG. 2, the circumferential outer surface of land 168 closes the inner side of groove 136 completely and edge 172 of the land is spaced axially rearward from edge 138 of groove 136.

A reaction mechanism 176 is positioned in piston bore section 130 forwardly of control valve 146 and includes a reaction piston housing 178 positioned against the shoulder 128 of bore section 130. A rubber-like reaction disc 180 is positioned with one disc side engaging the forward side of housing 178 and with the opposite side of the disc 180 being engaged by the output member 182. Member 182 is received in the forward end of piston bore section 130 and extends outwardly of the piston through the forward portion of housing bore 86. An output push rod 184 extends from output member 182 and is suitably positioned to actuate master cylinder 174. Reaction piston housing 178 has a stepped bore 186 therethrough with the larger portion extending forwardly and covered by disc 180. The reaction piston 188 is reciprocably received in bore 186 so that its larger diameter forward end 190 is engageable with the rear side of disc 180. Its rearward, smaller diameter, end 192 extends into a recess 194 formed in the forward end of control valve 146. There is a reaction gap defined by the axial distance between reaction piston rear end 192 and the bottom surface of recess 194. A valve return spring 196 acts against reaction piston housing 178 and the forward end of control valve 146 to continually urge the control valve to the rearward position illustrated.

The system is illustrated in FIG. 1 in a condition before pressure has been generated and with very little or no operating pressure in the accumulator and booster. When the pump 12 is energized, fluid is delivered from it through conduit 22 and power steering gear 14 to conduit 24. The valve 60 of pilot valve 38 is positioned so that inlet 44 is not connected with outlet 54. The fluid therefore passes through check valve 26 and into the accumulator 30 and booster inlet 28. Since the closed center portion 174 of the booster control valve does not permit fluid flow through booster outlet 48, the fluid is pressurized in conduit 24, accumulator 30, and brake booster chambers 114 and 116. The charging pressure is also transmitted to pilot valve inlet 36 so that it can act on valve 60. When the charging pressure reaches the desired value, it is sufficient to move valve 60 downwardly so that inlet 44 communicates with outlet 54 through groove 68. This reduces the pressure coming out of the power steering gear 14, allowing check valve 26 to close. In this condition the pump 12 merely circulates hydraulic fluid through the power steering gear and the pilot valve to the pump reservoir. If for any reason the pilot valve should not function properly, the pressure relief valve 42 will open at a predetermined maximum charging pressure so as to limit the pressure delivered to the accumulator and brake booster.

When the vehicle operator actuates the brake pedal 72, control valve 146 moves forward against the force of spring 196, closing open center valve portion 164. This interrupts fluid communication between chamber 114 and 116. Slight additional forward movement of the control valve 146 opens closed center valve portion 174 so that the pressure in chamber 116 is modulated out of that chamber and into exhaust chamber 112. The fluid so displaced passes through outlet 48 and conduit 46, returning to the pump reservoir 18. The decrease in pressure in chamber 116 sets up a pressure differential across the piston power wall 98, moving the booster power piston in the brake actuating direction. The force so generated is transmitted through shoulder 128 and reaction piston housing 178 to reaction disc 180. The force is then delivered to output member 182 and output push rod 184 to actuate master cylinder 74. The master cylinder pressurizes brake fluid in brake circuits 76 and 78, actuating the brakes 80 and 82. The forward movement of control valve 146 takes up the reaction gap between reaction piston end 192 and the bottom of recess 194, and the forward end of the reaction piston 188 also engages reaction disc 180. As is well known, the reaction disc compresses slightly and transmits reaction force to the reaction piston and the reaction piston housing in a ratio equal to the ratio of their respective areas. Thus the vehicle operator feels reaction force transmitted through the control valve 146 and push rod 152 to brake pedal 72.

Upon brake release valve section 174 closes and valve section 164 opens, permitting operating pressure in chamber 114 to again be exerted in chamber 116. In the releasing action the operator may modulate the increase in chamber 116 by controlling a valve 164. A particular pressure differential may be established and held during either apply or release by maintaining both valve 164 and valve 174 in a closed or poised position. Upon full booster release, the operating pressure in chamber 114 is also found in chamber 116.

If the pump 12 is not operating but the accumulator 30 and booster 16 are charged, the vehicle operator may actuate the booster in the same manner as above described. Several booster operations may be provided depending upon the capacity of accumulator 30. If there is no operating pressure available, or booster runout occurs and additional braking action is demanded, the operator will move the control valve 146 forwardly until its shoulder 156 engages shoulder 124 of the power piston. Thus manual force is transmitted directly and mechanically through the power piston and the reaction mechanism 176 to the output push rod 184.

The brake system is fully operable hydraulically, requiring no vacuum as do many current brake boosters. The system is therefore very useful with vehicles having diesel engines or other power plants where little or no vacuum is available. By hydraulic pressure suspending the booster and exhausting only the amount of fluid necessary to establish a pressure differential during operation, there is no hydraulic noise due to fluid flow through the booster such as that which sometimes occurs in open center hydraulic booster systems. The system provides a reserve pressure source and can be used in conjunction with other hydraulic control systems. Since the power piston is pressure balanced, consistent feel during braking operation under various operating conditions is maintained.

The embodiments of the invention in which an exclusive property or privilege is claimed are defined as follows:

1. A hydraulic pressure actuated power brake system comprising:

a pump for generating hydraulic pressure;

a hydraulic pressure suspended closed center power brake booster;

a hydraulic fluid reservoir for said pump;

a first conduit connecting the output side of said pump to the input side of said booster and having a check valve therein permitting fluid flow therethrough only in the direction from said pump toward said booster;

a second conduit connecting the output side of said booster with said reservoir;

an accumulator connected in said first conduit between said check valve and said booster and adapted to be charged with hydraulic pressure from said pump;

a pressure relief valve connecting said first conduit between said check valve and said booster with said second conduit and limiting the fluid pressure in said accumulator and said booster to a predetermined maximum value; and a pilot pressure operated pressure charging valve having fluid communication with said first conduit on each side of said check valve and also being in fluid communication with said second conduit, said pilot valve and said relief valve cooperating to maintain and provide an operating pressure generated by said pump in the portion of said first conduit from said check valve into said booster and in said accumulator, said operating pressure being maintained within a predetermined pressure range suitable for establishing a differential pressure in said booster when said booster is actuated irrespective of said operating pressure generated by said pump in the portion of said first conduit between said pump and said check valve at the time of brake actuation.

* * * * *